Figure 1:
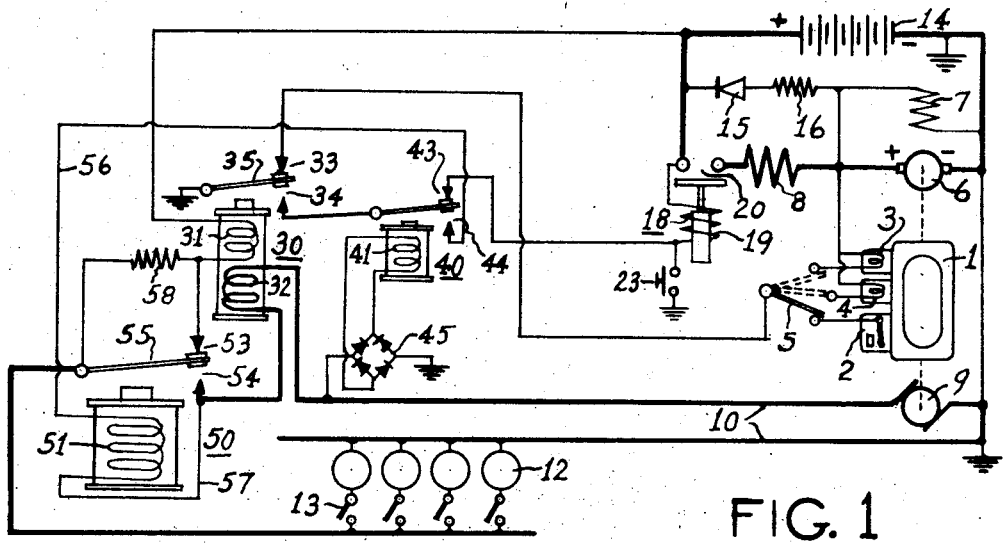

Dec. 8, 1959    W. E. McFARLAND    2,916,634
STARTING CONTROL CIRCUIT FOR ENGINE-GENERATOR PLANTS
Filed Sept. 16, 1957

WILLIAM E. McFARLAND
INVENTOR.

United States Patent Office

2,916,634
Patented Dec. 8, 1959

2,916,634

STARTING CONTROL CIRCUIT FOR ENGINE-GENERATOR PLANTS

William E. McFarland, Nutley, N.J.

Application September 16, 1957, Serial No. 684,290

4 Claims. (Cl. 290—30)

This invention relates to control apparatus for automatic starting of small electric generating plants, in response to power demand in a load circuit. A control of this nature usually is wall-mounted near the plant, and often is called a "demand-start" control. A storage battery furnishes the engine cranking power. Most small electric plants are of the A.-C. type, and the exciter generator thereof may be used as a starting motor. A cranking relay is a usual component of the electric plant, and the cranking circuit is closed by energizing the coil of the cranking relay.

One element of demand-start apparatus is the control relay. Its function is to energize the cranking relay immediately upon occurrence of load current demand and to provide a switching action which stops or idles the engine when such demand ceases. The control relay must be held energized so long as power demand continues. It is not unusual to use two or even three individual relays to provide the functions of the control relay. However, the functions are the same whether obtained from one or several relay devices and, for the sake of simplicity, the description and drawings herein will refer to a control relay arrangement which consists of only one relay device.

Another necessary element of demand-start apparatus is a "line relay." In de-energized condition, it connects the load lines with the starting battery so that a battery current will start flowing through any load appliance that becomes connected across the load lines. The control relay necessarily has an operating coil connected in series with this battery circuit, and thus the control relay becomes energized when any load appliance is connected, and effects cranking action. The line relay must become energized at a certain point of initial engine acceleration and, when energized, it will disconnect the load lines from the battery and connect them to the A.-C. generator, thus satisfying the power demand. Furthermore, the control apparatus must include provision to de-energize the cranking relay at a suitable point of engine acceleration. The control relay remains energized during power demand and does not provide switching action to stop or idle the engine until power demand has ceased.

The invention herein described is limited to a circuit for energizing the operating coil of the line relay. The simplest and commonest practice has been to connect the coil of the line relay permanently in shunt with either the exciter or the A.-C. generator, so that the line relay will become energized to an operative extent when voltage rises sufficiently during acceleration, and will revert to its de-energized status when generated voltage drops off as when approaching a stop. An objection to this simplest practice is that the energization of the line relay occurs gradually, tending to require "make-before-break" contact arrangement to avoid the adverse effect of creepage or chattering of the line relay contacts. Another objection is that the line relay does not become operatively de-energized directly when all load is removed from the load lines, but only as the engine approaches a stop.

A demand-start controller is illustrated and described in Patent #2,804,551 issued August 27, 1957, to William E. McFarland, in which the line relay is de-energized instantly upon disconnection of all load, but the line relay is energized only gradually as in the aforesaid simplest practice.

The principal object of the present invention is to provide a demand-start control system wherein it is made possible to employ relays of the simplest type and in which the number of relay contacts can be kept at the minimum, and in which system the line relay is energized suddenly, rather than gradually, and will become de-energized immediately upon disconnection of load. Such a system necessarily will include a control relay having provision for initial and holding energization, a voltage responsive relay, and a line relay. A specific object of the invention is to obtain the desired control of energization of the line relay, while being able to utilize a control relay having the simple single pole double throw type of switching contacts. A further specific object of the invention is to provide a very simple circuit arrangement in which the line relay is energized by battery current.

Figure 2:
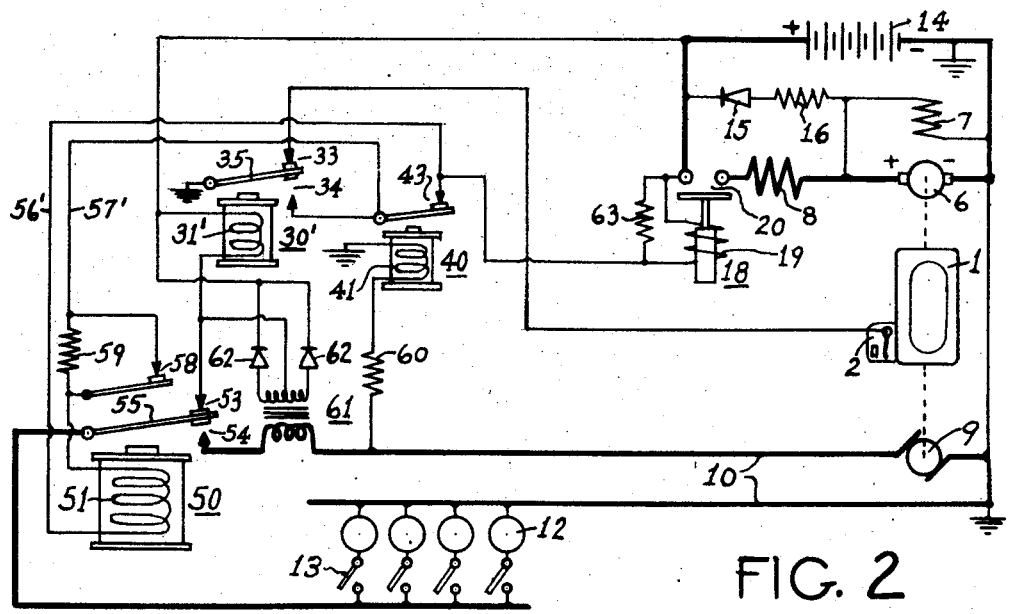

The invention will be more clearly understood by reference to the accompanying drawings, in which Figure 1 depicts a circuit showing the main components of a typical small engine-generator plant, together with demand-start control apparatus embodying the present invention, while Figure 2 illustrates a similar circuit presenting a preferred embodiment of the invention. In the figures, the elements most directly associated with the plant are shown at the right, and the control apparatus at the left. Similar numerals refer to similar parts in the figures.

Referring to Figure 1, engine 1 (which is schematically shown) may have a magneto 2, the grounding of which will stop the engine immediately. Delayed stopping also may be provided, as by a solenoid valve which shuts off the engine fuel line so that the engine runs only until local fuel is exhausted, such as that in a carburetor bowl. Numeral 3 indicates the operating coil of such a shut-off valve, whereby fuel will remain shut off only during such interval as coil 3 is energized. Numeral 4 indicates the operating coil of an idling device, whereby for the period that coil 4 is energized, the engine will be operated at a lower-than-normal speed, perhaps at one-third normal speed. A manual switch 5 determines which of the elements 2, 3 and 4 will be affected by action of the hereinafter-mentioned control relay.

Engine 1 drives exciter armature 6 and A.-C. armature 9. In practice, the exciter winding and A.-C. winding often are carried on a common rotor, thus, one shunt field 7 is adequate for generating exciter current and load current. Exciter 6 also is provided with a series (cranking) field 8. Load circuit lines (service mains) are indicated by heavy lines and by numeral 10. Individual loads 12 are connectable to the lines by individual switches 13. Starting battery 14 has its negative side grounded. The negative side of exciter armature 6 also is connected to ground, as is one side of A.-C. armature 9. Rectifier 15 and resistor 16 permit a small battery charging current to flow at such time when the plant is operating at normal speed.

A cranking relay 18 has contacts 20 which can carry the heavy cranking current, and has an operating coil 19. Coil 19 has one terminal connected permanently to one side of the battery, such as a permanent connection to battery positive, as shown. Push button 23 enables energization of coil 19 independently of the automatic control apparatus. Cranking current flows from battery positive, through contacts 20, when closed, through series field 8 and armature 6 to negative, to drive armature 6 as a cranking motor.

The demand-start control apparatus includes a control relay 30, a voltage-responsive relay 40, and a line relay 50. Coil 31 of the control relay is for energizing relay 30 by battery, and coil 32 is a holding coil deriving the relay energization from load circuit current. The effect of coil 32 will be weak when load current is small. Hence, it is preferable that coil 32 be required only to hold down armature 35, and never to pull in the control relay.

Relay 30 has a normally-closed contact 33 for making the ground connection which will idle or stop the engine, and a normally-open contact 34 for closing the energization circuit of coil 19.

Relay 40 has an operating coil 41 for energization by generated current, for example, by connection with the A.-C. generator through rectifier 45, as shown. A normally-closed contact 43 is connected in series with the circuit of cranking relay coil 19, and a normally-open contact 44 is connected in series with coil 51 of relay 50. Relay 40 will be designed and adjusted so that it opens contact 43 (and closes contact 44) at some point during the rise of A.-C. voltage after the engine has started firing under its own power, preferably just as the voltage begins to approach normal.

Relay 50 has a normally-closed contact 53 which, when closed, is connected in series with the energization circuit of coil 31, and relay 50 has a main contact 54 which when closed, connects A.-C. armature 9 with the load lines. A high value resistance 58 can be employed across contacts 53 to permit a small A.-C. current to pass through coil 31 (and through battery 14) when contact 54 is closed. This current merely aids coil 32 to keep relay 30 operably energized at light load condition.

Assuming now that the engine is stopped and switch 5 is in the upper dotted line position, engine fuel will not be shut off at this stage since no exciter current is being generated to energize coil 3. If a switch 13 becomes closed, a current flows from battery positive, through coil 31, contact 53, load 12, and then to ground (negative). Relay 30 thus is energized by battery 14, thus closing contact 34. As a result, cranking relay 18 becomes energized, the circuit being from battery positive, through coil 19, through closed contacts 43 and finally 34, to ground (negative). Then contact 20 closes, and the engine is cranked and it accelerates, whereby relay 40 becomes operatively energized. Then, contact 43 opens to de-energize relay 18. Contact 44 closes, which results in the adequate energization of line relay 50, the circuit being from the non-grounded side of A.-C. armature 9, through wire 57, coil 51, wire 56, contact 44, contact 34, to ground, representing the opposite side of armature 9. The energization of relay 50 results in a quick switching action by relay 50 which opens contact 53 and closes contact 54, thus interrupting the battery energization of relay 30 and connecting armature 9 with the load lines. The effect of coil 32 will now hold relay 30 at its energized status, so that contact 34 will remain closed, and contacts 34, 44 and 54 will all remain closed until all line load is disconnected. When all load switches 13 are opened, relay 30 will be de-energized immediately since the slight current passing through resistor 58 will of its self be inadequate for energization, so that contact 34 must open and contact 33 must close. Coil 51 thus becomes de-energized immediately upon disconnection of all load and contact 54 immediately opens and, likewise, contact 53 closes. Closing of control relay contact 33 will energize coil 3 by a circuit from exciter positive, through coil 3, switch 5, and contact 33 to ground (negative), and the main fuel supply will be shut off resulting in a slightly delayed stop of the engine. Relay 40 will revert to the de-energized position (with contact 43 closed) as the engine approaches a stop. However, if a load switch 13 is closed before exhaustion of local fuel takes effect, there will be established a new flow of battery current, that is, from battery positive, through coil 31, contact 53, and load 12, to battery negative, giving an adequate renewal of energization for relay 30, thus again closing contact 34. Since contact 44 will have remained closed, line relay 50 will be instantly re-energized on closing of contact 34, thus again setting up the running circuit. The particular advantage of the arrangement of Figure 1 is that line relay 50 is under the combined control of control relay 30 and voltage relay 40 and, in turn, armature 35 of the control relay invariably is set or reset to the energized position by benefit of battery current. There are several circumstances which may cause the necessity for control relay 30 to be reset (after momentary de-energization) to the energized position. For example, there may be a momentary lapse in the flow of load current, as due to poor connections in the load line, or momentary release of pressure on the trigger switch of load appliances of some types. In the circuit of Figure 1, it is not necessary that holding coil 32 be designed to have the power to pull-in armature 35, since pull-in is always accomplished by battery current whether or not there has been any deceleration of the engine, when the need for re-energizing the control relay occurs.

If switch 5 were in the intermediate (broken line) position, then engine 1 would drop back to idling speed when all switches 13 were opened. Relay 40 should be designed so that it holds contact 44 closed even during the idling period. When a switch 13 is closed next again, battery current will flow through coil 31 to re-energize relay 30 and thus again close contact 34. Considering that generated frequency is low during idling speed, the effect of coil 32 may not be adequate to hold relay 30 in properly energized condition, so that armature 35 may start to rise. However, if this occurs, relay 50 again becomes de-energized, resulting in a repetition of battery current through coil 31 and, although relays 30 and 50 may bobble or chatter for a second or so, the engine will keep accelerating until generated frequency is sufficient so that coil 32 can hold relay 30 definitely energized, and the running circuit will become established. If switch 5 is in the full line (lower) position, and all switches 13 then are opened, magneto 2 will become grounded through contact 33, and the engine will stop quickly unless there is a repetition of demand before deceleration is complete.

The several features and advantages of the circuit of Figure 1 now will be apparent. With its energization under the combined control of the voltage-responsive relay and the control relay, the line relay is energized strongly at the proper time and also is de-energized at the most appropriate time. The circuit is such that simple double-throw relay contacts can be employed, thereby reducing switching poles to the minimum. The normally-open contact 34 of the control relay serves dual purposes, since it makes the ground side connection for energizing coil 19 as well as coil 51.

It will also be apparent that it is not a necessity that coil 51 of the line relay be energized by A.-C. Wire 57 could be connected to exciter positive, rather than to the ungrounded side of the A.-C. generator, thus providing exciter energization of coil 51. Likewise, wire 57 could be connected to battery positive if battery energization is more convenient or preferable. The particular arrangement shown is thus most flexible and, as one feature, avoids the need for two electrically isolated switching poles as is common in control relays used for the present purpose.

The circuit of Figure 2 restricts the choice of energization for line relay 50 to battery energization (which, anyway, is the most desirable energization) and achieves the desired control of the line relay energization in the simplest manner. Figure 2 also illustrates that the energization plan for the control relay may be varied, as desired. In Figure 2 a current transformer 61, together with rectifiers 62 provide the holding energization for control relay 30' which has only a single operative winding 31'. Rectifier polarity is such as not to interfere with the battery energization of coil 31'. Battery energization of coil 51 is most simply obtained by connecting the terminals of coil 51 across normally-closed contact 43 through means of wires 56' and 57'. Relay 40 is required to operate only a single contact, and thus can hold the energized status more strongly and definitely under adverse conditions, such as during loss of voltage or frequency due to overload or other causes. There are certain objections to energizing relay 40 by exciter voltage due, especially, to an abnormally high voltage reading across exciter armature 6 during the cranking cycle. Since it is required to operate only a single switching contact, relay 40 may be operated by A.-C. and even without benefit of a rectifier. To compensate partially the omission of the rectifier of Figure 1, a resistor 60 is provided, having several times the D.-C. resistance of coil 41. This resistor prevents any undue tendency for the relay to be operatively energized prematurely because of the reduced coil impedance before frequency has arisen.

A resistor 59 is shown to be connected in series with coil 51 at such time as an auxiliary contact 58 (of line relay 50) is open. The adjustment of contact 58 will be such that resistor 59 is not inserted until armature 55 is completing its motion toward the energized position. Resistor 59 and auxiliary contact 58 may be omitted in many instances.

The sequence of operation for the arrangement of Figure 2 is as described for Figure 1. It will be apparent that relay contact 34 will close and obtain engine cranking when any switch 13 is closed, and that relay 40 will open contact 43 as generated voltage rises. Opening of contact 43 removes the short circuit of coil 51, which places coil 51 in series with coil 19, thereby reducing the voltage drop across coil 19. The intent here is to obtain effective operative energization of relay 50 and effective de-energization of relay 18 at the instant of opening of contacts 43. Thus, coil 51, at least when including resistor 59 in its circuit, must present sufficiently high resistance value to so reduce current through coil 19 that contacts 20 must open cleanly. Typical cranking relays used for electric plants have coils which draw a high current, since the duty cycle is short. Thus, a significant current may pass through coil 19 without any noticeable energization effect. Obviously, the resistance of coil 19 must be low enough so that sufficient current can pass therethrough to obtain proper energization of coil 51. A resistor 63 may be placed in parallel with coil 19 to insure further the needed low value of resistance and, in practice, there frequently are inherently one or more resistances in parallel with coil 19. As one practical example of resistance values, the reading across coil 19 may be 3 ohms or less, across battery 14, 12 volts, and across coil 51, the resistance may be as low as, say, 3 ohms, while across resistor 59, it may be 10 ohms or higher, as required, but definitely high enough to insure that coil 19 is effectively de-energized at the time when resistor 59 is inserted in the circuit.

As was outlined in the case of Figure 1, relay 50 necessarily will be deenergized immediately upon de-energization of control relay 30', since contact 34 must open as soon as load current ceases. Control relay 30' will be reset always to the energized position through benefit of battery current, so that transformer 61 is not required to provide more than an adequate holding energization.

I claim:

1. In a demand-start control system for an engine-generator set serving loads connectable to load lines, said engine-generator set including a starting battery, a cranking relay having an operating coil energizable from said battery, and battery-energizable cranking means wherein energization is effected to crank the engine for starting by the closing of said cranking relay, said control system included a line relay having an operating coil and an energization source therefor, and having a normally-closed contact which, when closed, connects the load lines to the battery, said line relay also having a normally-open contact which, when closed, connects the load lines to the load generator, said control system also including a load-responsive control relay having an operating coil connected in series with said normally-closed contact and with the starting battery, whereby said control relay becomes energized when a load is initially connected across the load lines, said control relay also having provision for deriving holding energization from the load circuit current flow which latter energization is effective only until disconnection of all load, said control relay having at least one normally-open contact, one of which, when closed, energizes said operating coil of said cranking relay to effect cranking of the engine, said control relay also having switching means operable when said control relay is de-energized, which latter means, upon said de-energization, at least effects the slowing down of the engine, said control system also including a voltage-responsive relay having a normally-closed contact connected in series with the coil of said cranking relay and said normally-open contact of said control relay whereby energization of said cranking relay is interrupted during initial engine acceleration by opening of said last-mentioned normally-closed contact, the improvement comprising circuit connection means for effecting energization of the operating coil of said line relay by said source, said circuit connection means being designed and arranged to connect said operating coil of said line relay to said source through one normally-open contact of said control relay in a manner that said line relay remains in energized condition only while said last-mentioned normally-open contact is closed, said circuit connection means also being designed and arranged to place said operating coil of said line relay under the control of said voltage-responsive relay in a manner that said operating coil of said line relay does not become operatively energized until said voltage-responsive relay becomes operatively energized by rising voltage.

2. In a demand-start control system for an engine-generator set serving loads connectable to load lines, said engine-generator set including a starting battery, a cranking relay having an operating coil energizable from said battery, and battery-energizable cranking means wherein energization is effected to crank the engine for starting by the closing of said cranking relay, said control system including a line relay having an operating coil and an energization source therefor, and having a normally-closed contact which, when closed, connects the load lines to the battery, said line relay also having a normally-open contact which, when closed, connects the load lines to the load generator, said control system also including a load-responsive control relay having an operating coil connected in series with said normally-closed contact and with the starting battery, whereby said control relay becomes energized when a load is initially connected across the load lines, said control relay also having provision for deriving holding energization from the load circuit current flow, which latter energization is effective only until disconnection of all load, said control relay having one normally-open contact which, when closed, energizes said operating coil of said cranking relay to effect cranking of the engine, said control relay also having switching means operable when said control relay is de-energized, which latter means, upon said de-energization at least effects the slowing down of the engine, said control system also including a voltage-responsive relay having a normally-closed contact connected in series with the coil of said cranking relay and said normally-open contact of said control relay whereby energization of said cranking relay is interrupted during initial engine acceleration by opening of said latter contact, the improvement comprising circuit connection means for effecting energization of the operating coil of said line relay by said source, said circuit connection means being designed and arranged to connect said operating coil of said line relay to said source through said normally-open contact of said control relay in a manner that said line relay remains in energized condition only while said latter normally-open contact of said control relay is closed, said circuit connection means also being designed and arranged to place said operating coil of said line relay under the control of said voltage-responsive relay in a manner that said operating coil of said line relay does not become operatively energized until said voltage-responsive relay becomes operatively energized by rising voltage.

3. In a demand-start control system for an engine-generator set serving loads connectable to load lines, said engine-generator set including a starting battery, a cranking relay having an operating coil energizable from said battery, and battery-energizable cranking means wherein energization is effected to crank the engine for starting by closing of the cranking relay, said control system including a line relay having a battery-energizable operating coil and having a normally-closed contact which, when closed, connects the load lines to the battery, said line relay also having a normally-open contact which, when closed, connects the load lines to the load generator, said control system including a load-responsive control relay having an operating coil connected in series with said normally-closed contact and with the starting battery, whereby said control relay becomes energized when a load is initially connected across the load lines, said control relay also having provision for deriving holding energization from the load circuit current flow, which latter energization is effective only until disconnection of all load, said control relay having one normally-open contact connected in series with said operating coil of said cranking relay and which, when closed, energizes said latter coil to effect cranking of the engine, said control relay also having switching means operable when said control relay is de-energized, which latter means, upon said de-energization at least effects the slowing down of the engine, said control system also including a voltage-responsive relay having a normally-closed contact connected in series with the coil of said cranking relay and said normally-open contact of said control relay whereby energization of said cranking relay is interrupted during initial engine acceleration by opening of said latter contact, the improvement comprising circuit connection means for effecting the battery energization of the operating coil of said line relay consisting of connection means for connecting the terminals of said latter coil across said normally-closed contact of said voltage-responsive relay, whereby, when said latter contact is opened when said voltage-responsive relay becomes operatively energized by rising voltage, said operating coil of said line relay will be connected in series with said operating coil of said cranking relay for operative energization of said line relay, and whereby the energization of said line relay will be interrupted when the normally-closed contact of the control relay opens in response to lack of holding energization therefor, the resistance value of said operating coil of said line relay being high enough to reduce battery current flow through said operating coil of said cranking relay to a level whereby said cranking relay is operatively de-energized when the line relay is energized.

4. A demand-start control system according to claim 1 in which the voltage-responsive relay has a normally-open contact in addition to said normally-closed contact in which said circuit connection means are designed and arranged in a manner so that said operating coil of said line relay is connected to said source through said last-mentioned normally-open contact so that said operating coil of said line relay does not become operatively energized until said voltage-responsive relay becomes operatively energized and closes said last-mentioned contact.

References Cited in the file of this patent
UNITED STATES PATENTS

| | | |
|---|---|---|
| 2,611,877 | Walters | Sept. 23, 1952 |
| 2,804,551 | McFarland | Aug. 27, 1957 |